United States Patent
Kwak et al.

(10) Patent No.: US 11,305,451 B2
(45) Date of Patent: Apr. 19, 2022

(54) APPARATUS AND METHOD FOR NOTCHING ELECTRODE SHEET

(71) Applicant: LG CHEM, LTD., Seoul (KR)

(72) Inventors: Dong Hoon Kwak, Daejeon (KR); Hyun Kyu Eom, Daejeon (KR); Yang Ho Shin, Daejeon (KR)

(73) Assignee: LG ENERGY SOLUTION, LTD., Seoul (KR)

(*) Notice: Subject to any disclaimer, the term of this patent is extended or adjusted under 35 U.S.C. 154(b) by 99 days.

(21) Appl. No.: 16/815,876

(22) Filed: Mar. 11, 2020

(65) Prior Publication Data

US 2020/0206965 A1 Jul. 2, 2020

Related U.S. Application Data

(63) Continuation of application No. PCT/KR2018/014643, filed on Nov. 26, 2018.

(30) Foreign Application Priority Data

Mar. 7, 2018 (KR) .................. 10-2018-0027031

(51) Int. Cl.
*B23Q 1/40* (2006.01)
*B26F 1/12* (2006.01)
(Continued)

(52) U.S. Cl.
CPC ............ *B26F 1/12* (2013.01); *B23K 26/36* (2013.01); *B23K 26/38* (2013.01); *B26D 7/015* (2013.01);
(Continued)

(58) Field of Classification Search
CPC ......... B26F 1/12; H01M 50/531; H01M 4/04; B23K 26/36; B23K 26/364; B23K 26/38;
(Continued)

(56) References Cited

U.S. PATENT DOCUMENTS 9,246,194 B2 * 1/2016 Min ................. H01M 10/0459
9,450,217 B2 9/2016 Han
(Continued)

FOREIGN PATENT DOCUMENTS

EP 2 648 248 A2 10/2013
JP 2014-75340 A 4/2014
(Continued)

OTHER PUBLICATIONS

Machine English Translation of KR-20150111551-A (Year: 2015).*
(Continued)

*Primary Examiner* — Sang Y Paik
*Assistant Examiner* — Erwin J Wunderlich
(74) *Attorney, Agent, or Firm* — Birch, Stewart, Kolasch & Birch, LLP

(57) ABSTRACT

Discussed is an apparatus for notching an electrode sheet for an electrode tab, the apparatus including: a transfer unit including first and second transfer rollers to continuously, transfer the electrode sheet at regular intervals; a jig unit disposed between the first and second transfer rollers, and supporting a non-coating portion of the electrode sheet; and a notching unit to notch the non-coating portion supported on the jig unit, wherein the jig unit includes: a rotation member provided between the first and second transfer rollers and rotated in a direction perpendicular to a transfer direction of the electrode sheet; and two or more jigs to support the non-coating portion disposed between the first and second transfer rollers, and the jig unit is able to improve a supporting force of the electrode sheet, to prevent the electrode sheet from vibrating, and accurately notch an electrode tab to the electrode sheet.

19 Claims, 9 Drawing Sheets

(51) Int. Cl.
    *B26D 7/01*     (2006.01)
    *B65H 20/02*     (2006.01)
    *B65H 35/00*     (2006.01)
    *H01M 4/04*     (2006.01)
    *H01M 50/531*     (2021.01)
    *B23K 26/36*     (2014.01)
    *B23K 26/38*     (2014.01)

(52) U.S. Cl.
    CPC ........... *B65H 20/02* (2013.01); *B65H 35/008* (2013.01); *H01M 4/04* (2013.01); *H01M 50/531* (2021.01); *B23Q 1/40* (2013.01)

(58) Field of Classification Search
    CPC ...... B26D 7/015; B65H 20/02; B65H 35/008; B65H 20/04
    USPC ..................................................... 219/121.72
    See application file for complete search history.

(56) References Cited

U.S. PATENT DOCUMENTS

| | | |
|---|---|---|
| 2004/0026384 A1 | 2/2004 | Mueller et al. |
| 2013/0247637 A1 | 9/2013 | Min et al. |
| 2015/0024263 A1 | 1/2015 | Han |
| 2018/0079035 A1 | 3/2018 | Watanabe |
| 2018/0304410 A1 | 10/2018 | Watanabe |

FOREIGN PATENT DOCUMENTS

| | | | |
|---|---|---|---|
| JP | 2016-175100 A | | 10/2016 |
| JP | 6002355 B1 | | 10/2016 |
| JP | 2017098210 A | * | 6/2017 |
| KR | 10-2013-0095368 A | | 8/2013 |
| KR | 10-2014-0004011 A | | 1/2014 |
| KR | 10-2015-0010481 A | | 1/2015 |
| KR | 10-2015-0089803 A | | 8/2015 |
| KR | 20150111551 A | * | 10/2015 |
| KR | 10-2016-0109384 A | | 9/2016 |
| KR | 20160109384 A | * | 9/2016 |
| KR | 10-2017-0048757 A | | 5/2017 |
| KR | 10-2018-0004582 A | | 1/2018 |
| WO | WO 2017/119011 A1 | | 7/2017 |

OTHER PUBLICATIONS

Machine English Translation of KR-20160109384-A (Year: 2016).*
Machine English Translation of JP-2017098210-A (Year: 2017).*
Extended European Search Report for European Application No. 18908950.1, dated Oct. 14, 2020.
International Search Report for PCT/KR2018/014643 dated Mar. 4, 2019.

* cited by examiner

APPARATUS AND METHOD FOR NOTCHING ELECTRODE SHEET

CROSS-REFERENCE TO RELATED APPLICATION

The present application is a By-Pass Continuation of International Application PCT/KR2018/014643, filed Nov. 26, 2018, which claims the benefit of the priority of Korean Patent Application No. 10-2018-0027031, filed on Mar. 7, 2018, the entire contents of which are hereby incorporated by reference in their entirety.

TECHNICAL FIELD

The present invention relates to an apparatus and method for notching an electrode sheet, and more particularly, to an apparatus and method for notching an electrode sheet, which are capable of improving quality of an electrode tab formed on the electrode sheet.

BACKGROUND ART

In general, secondary batteries refer to chargeable and dischargeable batteries, unlike primary batteries that are not chargeable. The secondary batteries are being widely used in the high-tech electronic fields such as mobile phones, notebook computers, and camcorders.

Such a secondary battery is classified into a can type secondary battery in which an electrode assembly is built in a metal can and a pouch type secondary battery in which an electrode assembly is built in a pouch. The pouch type secondary battery includes an electrode assembly, an electrolyte, and a pouch accommodating the electrode assembly and the electrolyte.

The electrode assembly has a structure in which a plurality of electrodes and a plurality of separators are alternately stacked. A method for manufacturing the electrode assembly having the above-described structure includes a process of pressing an electrode sheet, a process of slightly slitting the electrode sheet to match standards of a cell, a vacuum drying process, a process of notching the electrode tab on the electrode sheet, and a process of manufacturing the electrode assembly including the electrode sheet and a separator.

However, in the method for manufacturing the electrode assembly, the process of notching the electrode tab has a problem in which the electrode tab is irregularly notched due to vibration of the electrode sheet, resulting in a defect.

DISCLOSURE OF THE INVENTION

Technical Problem

To solve the above problem, the present invention provides an apparatus and method for notching an electrode sheet, in which supporting force of the electrode sheet is improved to prevent the electrode sheet from vibrating, and particularly, accurately notch an electrode tab to the electrode sheet, thereby improving quality of the electrode sheet.

Technical Solution

To achieve the above object, an apparatus for notching an electrode sheet, which continuously notches a non-coating portion of the electrode sheet so as to be processed as an electrode tab, according to a first embodiment of the present invention includes: a transfer unit including first and second transfer rollers provided on a bottom surface of the electrode sheet to continuously transfer the electrode sheet at regular intervals; a jig unit provided on a lower portion of or below the electrode sheet, disposed between the first and second transfer rollers, and supporting the bottom surface of the non-coating portion; and a notching unit provided on an upper portion of or above the electrode sheet to notch the non-coating portion supported on the jig unit to provide the electrode tab, wherein the jig unit includes: a rotation member provided between the first and second transfer rollers and rotated in a direction perpendicular to a transfer direction of the electrode sheet; and two or more jigs provided on an outer circumferential surface of the rotation member to support the non-coating portion disposed between the first and second transfer rollers when the rotation member is rotated.

Each of the first and second transfer rollers may be disposed to be spaced a length from each of the two or more jigs supporting the non-coating portion formed on the electrode sheet.

The first length may range from approximately 30 m to 100 mm.

The rotation member may be rotated to be interlocked when the first and second transfer rollers are rotated to circulate each jig to be disposed on the non-coating portion between the first and second transfer rollers.

Each jig may be detachably coupled to a coupling part provided on an outer circumferential surface of the rotation member.

Each jig may include a coupling piece detachably coupled to the coupling part and a supporting piece supporting the non-coating portion.

Each jig may further include a fixing piece fixing the supporting piece to the coupling piece without moving.

The apparatus may further include an elevation unit allowing the jig unit to descend in a direction that is away from the non-coating portion or ascend in a direction towards the non-coating portion.

A method for notching an electrode sheet by using the apparatus for notching the electrode sheet according to the first embodiment of the present invention includes: a step (a) of rotating first and second transfer rollers to transfer the electrode sheet at regular intervals; a step (b) of rotating a rotation member of a jig unit in a direction perpendicular to a transfer direction of the electrode sheet to allow any one jig of two or more jigs provided on the rotation member to be disposed on a bottom surface of the non-coating portion disposed between the first and second transfer rollers; a step (c) of allowing the rotation member to ascend by using an elevation unit so that the jig supports the bottom surface of the non-coating portion; a step (d) of notching the non-coating portion supported on the jig by using the notching unit so as to be processed as an electrode tab; and a step (e) of allowing the rotation member to descend by using the elevation unit so that the jig is separated from the electrode sheet.

Steps (a) to (e) may be repeatedly performed to continuously process the non-coating portion disposed between the first and second rollers so as to be processed as the electrode tab.

Steps (a) and steps (b) may be performed as the same time.

In an apparatus for notching an electrode sheet according to a second embodiment of the present invention, a supporting piece is movably coupled to a coupling piece in a direction of a center of a rotation member or vice versa.

Advantageous Effects

First: The apparatus for notching the electrode sheet according to the present invention may include the transfer unit transferring the electrode sheet and including the first and second transfer rollers, the jig unit disposed between the first and second transfer rollers to support the non-coating portion of the electrode sheet, and the notching unit notching the non-coating portion to process the electrode tab. The jig unit may include the rotation member and two or more jigs circulating by the rotation member to support the non-coating portion of the electrode sheet. Particularly, the rotation member may be rotated in the direction perpendicular to the transfer direction of the electrode sheet. As a result, the first and second transfer rollers may be disposed to be close to the jig provided on the rotation member. Thus, the electrode sheet disposed between the first and second transfer rollers may be more stably supported to prevent the electrode sheet from vibrating. Therefore, the non-coating portion of the electrode sheet disposed between the first and second transfer rollers may be accurately notched to improve the quality of the electrode sheet.

Second: in the apparatus for notching the electrode sheet according to the present invention, the first and second transfer rollers may be disposed to be spaced the first length from the jig supporting the non-coating portion formed on the electrode sheet. Here, the first length may range from 30 mm to 100 mm. That is, when the first length is less than 30 mm, the interference between the jig and the first and second transfer rollers may occur. Also, when the first length is greater than 100 mm, the electrode sheet may be deformed to be bent between the jig and the first transfer roller or between the jig and the second transfer roller. In this state, when the electrode sheet is transferred, the vibration may occur. As a result, the first length may range of 30 mm to 100 mm. Thus, the electrode sheet disposed between the first and second transfer rollers may be stably supported to prevent the electrode sheet from vibrating, thereby accurately notching the non-coating portion of the electrode sheet disposed between the first and second transfer rollers.

Third: In the apparatus for notching the electrode sheet according to the present invention, the rotation member may be rotated by being interlocked with the first and second transfer rollers. Thus, the two or more jigs disposed on the outer circumferential surface of the rotation member may be sequentially disposed on the non-coating portion of the electrode sheet disposed that is newly disposed between the first and second transfer rollers to reduce the work time, thereby improving the work efficiency.

Fourth: In the apparatus for notching the electrode sheet according to the present invention, the jig may be detachably disposed on the rotation member. Thus, the jig may be replaced and mounted according to the size and kind of the electrode sheet. Therefore, the apparatus for notching the electrode sheet may be interconvertibly used to significantly reduce the equipment purchase costs.

Particularly, the jig provided on the rotation member may be detachably disposed. Thus, the jig may be more stably and firmly detached.

Fifth: In the apparatus for notching the electrode sheet according to the present invention, the jig may include the coupling piece and the supporting piece. Particularly, the coupling part and the coupling pieces may be disposed on the same plane, and the supporting piece supporting the non-coating portion of the electrode sheet may be disposed on the horizontal surface. Therefore, the jig may be stably fixed to stably support the non-coating portion of the electrode sheet.

Sixth: In the apparatus for notching the electrode sheet according to the present invention, the supporting piece provided on the jig may be slidably coupled to the coupling piece. Thus, the supporting piece may slidably move so that the non-coating portion of the electrode sheet is supported to be closely attached to the supporting piece. Therefore, the non-coating portion of the electrode sheet may be stably supported to reduce the possibility of occurrence of the defect.

Seventh: In the apparatus for notching the electrode sheet according to the present invention, the supporting piece provided on the jig may be fixed to the coupling piece through the fixing piece. The fixed supporting piece may be fixed without moving to continuously support the non-coating portion of the electrode sheet, thereby realizing the continuity in work.

Eighth: The apparatus for notching the electrode sheet according to the present invention may include the elevation unit that allows the jig unit to move in the direction that is away from the electrode sheet or vice versa. Particularly, the elevation unit may allow the jig unit to descend before the rotation member and the first and second transfer rollers are rotated and ascend after the rotation member and the first and second transfer rollers are rotated. Thus, the friction between the jig and the non-coating portion of the electrode sheet when the rotation member is rotated may be prevented from occurring to prevent the defective electrode sheet from being manufactured.

BRIEF DESCRIPTION OF THE DRAWINGS

FIGS. 5 to 7 are views illustrating a method for notching an electrode sheet by using the apparatus for notching the electrode sheet according to the first embodiment of the present invention, wherein FIG. 5 is a side view illustrating a step of transferring the electrode sheet and a step of rotating a jig unit, and FIG. 6 is a side view illustrating a step of allowing a jig unit to ascend. FIG. 7 is a side view illustrating a step of notching the electrode sheet.

MODE FOR CARRYING OUT THE INVENTION

Figure 1:
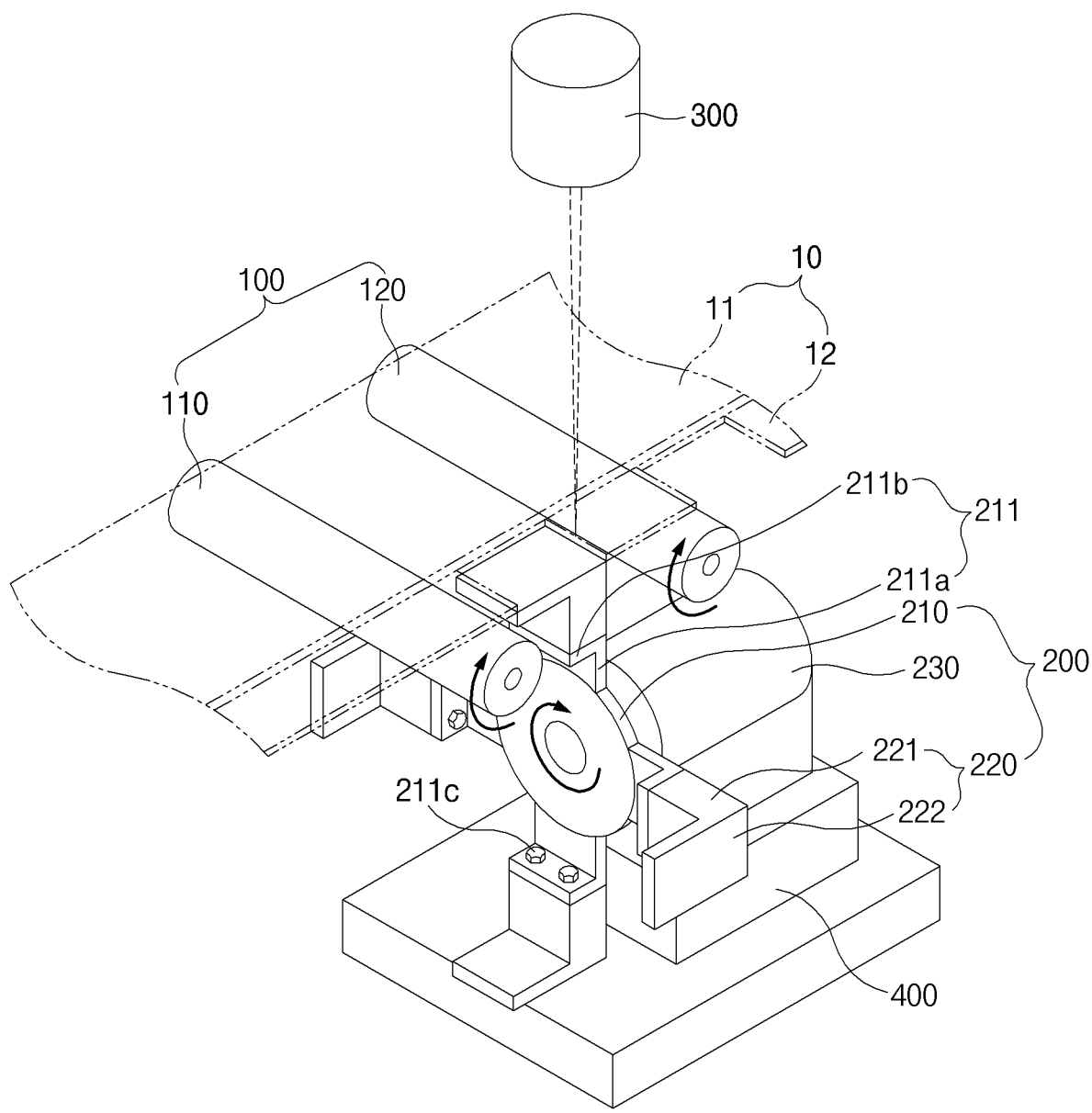
FIG. 1 is a perspective view of an apparatus for notching an electrode sheet according to a first embodiment of the present invention.

Hereinafter, embodiments of the present invention will be described in detail with reference to the accompanying drawings in such a manner that the technical idea of the present invention may easily be carried out by a person with ordinary skill in the art to which the invention pertains. The present invention may, however, be embodied in different forms and should not be construed as limited to the embodiments set forth herein. In the drawings, anything unnecessary for describing the present invention will be omitted for clarity, and also like reference numerals in the drawings denote like elements.

[Electrode Sheet According to First Embodiment of the Present Invention]

Figure 3:
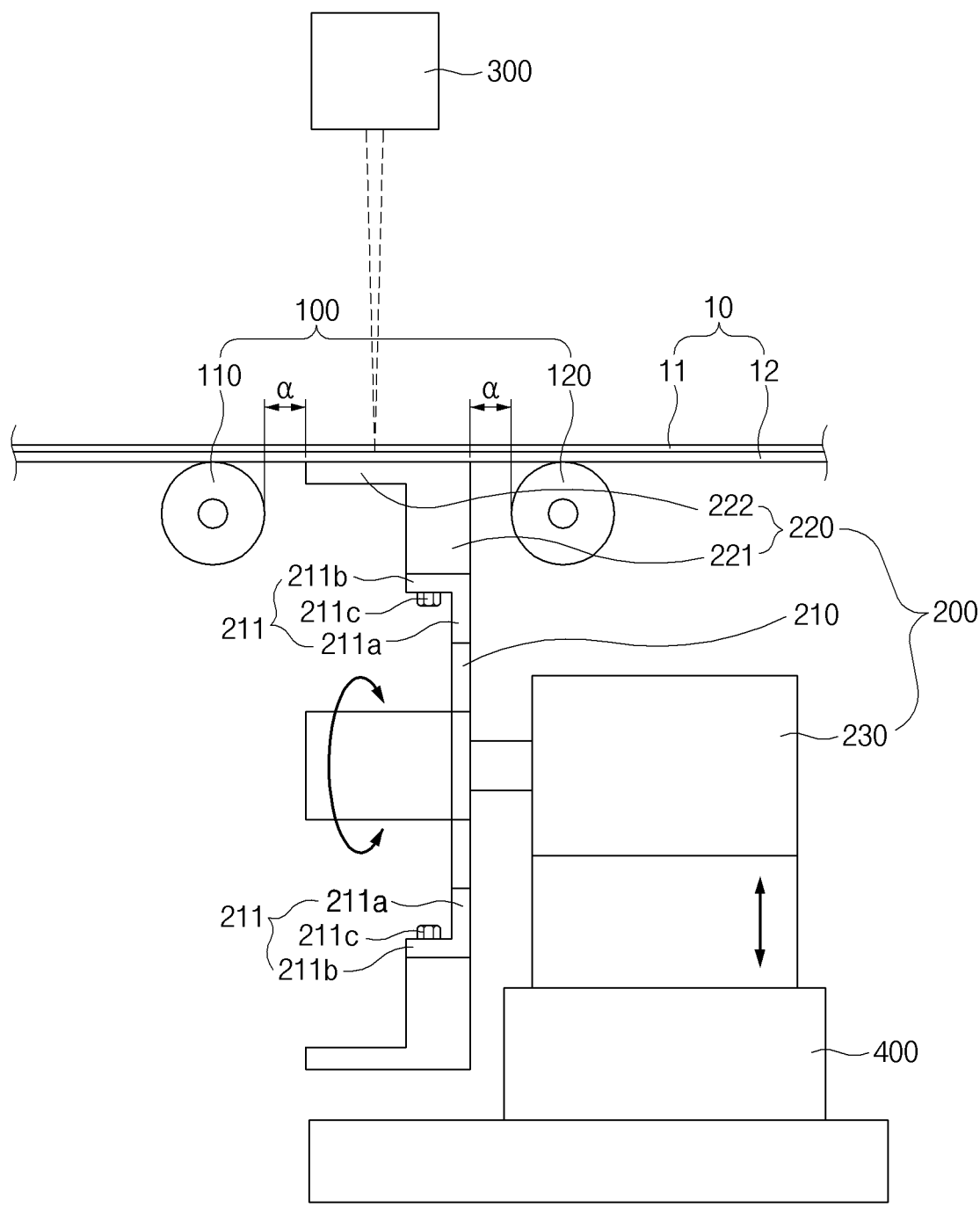
FIG. 3 is a side view of the apparatus for notching the electrode sheet according to the first embodiment of the present invention.

Referring to FIG. 3, an electrode sheet 10 according to a first embodiment of the present invention comprises a coating portion 11 on which an electrode active material is applied to one side of a collector having a long sheet shape and a non-coating portion 12 on which the electrode active material is not applied to the other side of the collector. The non-coating portion 12 may be notched through an apparatus for notching an electrode sheet and then processed as an electrode tab.

Here, the apparatus for notching the electrode sheet has a structure in which the non-coating portion of the electrode sheet 10 is prevented from vibrating. Thus, the non-coating portion may be accurately notched to be processed as the electrode tab, thereby preventing defective electrode sheets from being manufactured.

[Apparatus for Manufacturing Electrode According to First Embodiment of the Present Invention]

Figure 2:
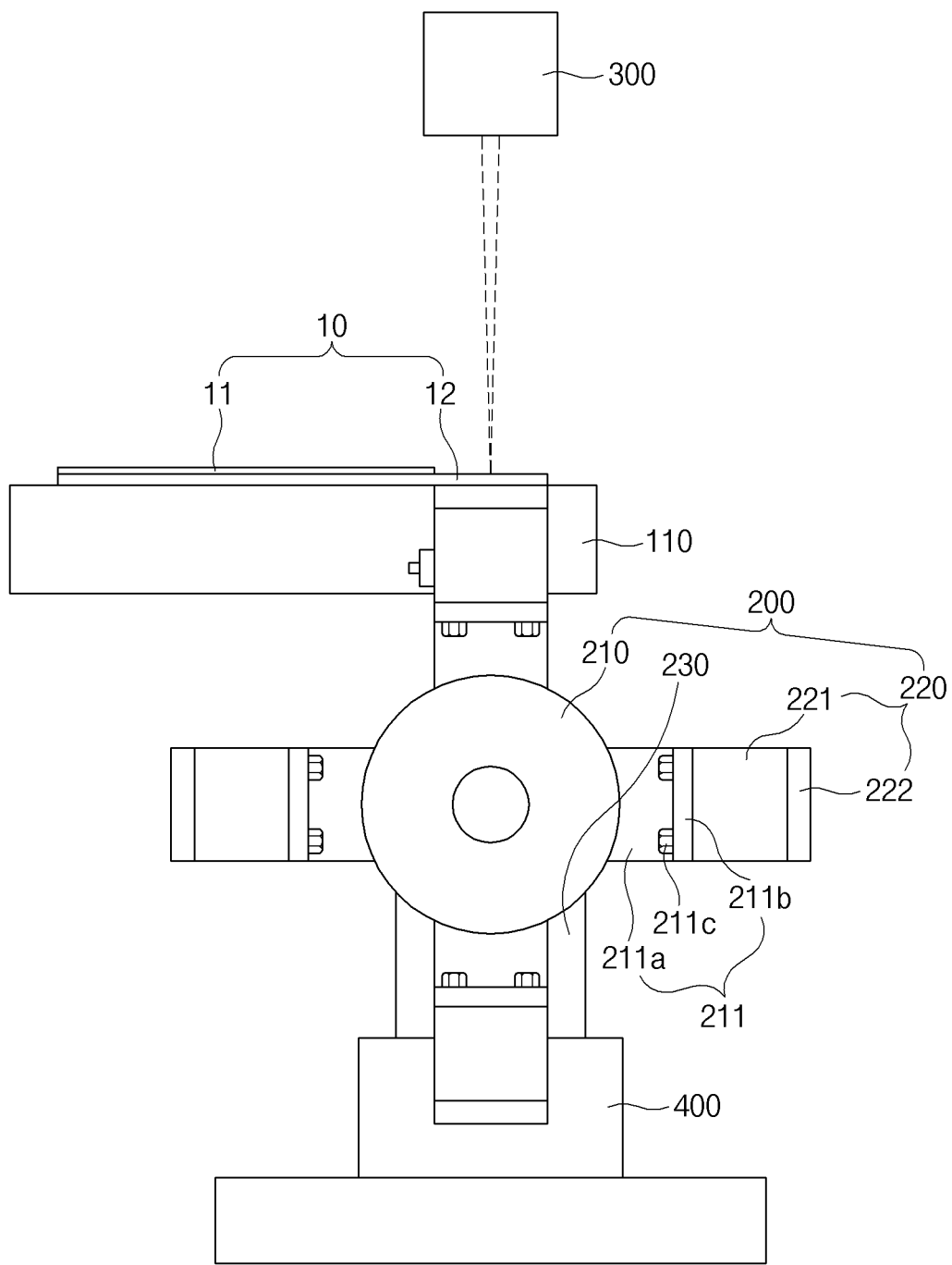
FIG. 2 is a front view of the apparatus for notching the electrode sheet according to the first embodiment of the present invention.

That is, as illustrated in FIGS. 1 to 3, an apparatus for notching the electrode sheet according to the first embodiment of the present invention is configured to continuously notch the non-coating portion of the electrode sheet so as to be processed as the electrode tab. The apparatus for notching the electrode sheet comprises a transfer unit 100 continuously transferring the electrode sheet 10 at regular intervals, a jig unit 200 supporting a bottom surface of the non-coating portion 12 of the electrode sheet 10 transferred by the transfer unit 100, and a notching unit 300 notching a top surface of the non-coating portion 12 supported by the jig unit 200 so as to be processed as the electrode tab.

Transfer Unit

The transfer unit 100 is configured to transfer the electrode sheet 10 from one side to the other side (from a left side to a right side when viewed in FIG. 1) and comprises a first transfer roller 110 and a second transfer roller 120 for example. When the first transfer roller 110 and the second transfer roller 120 are rotated while processing on the bottom surface of the electrode sheet, the first transfer roller 110 and the second transfer roller 120 move from one side to the other side of the electrode sheet 10 from a viewpoint of the electrode sheet.

For example, the first transfer roller 110 and the second transfer roller 120 may be disposed on left and right bottom surfaces of the electrode sheet 10. When the first transfer roller 110 and the second transfer roller 120 are rotated, the electrode sheet 10 is continuously transferred from the first transfer roller 110 to the second transfer roller 120 at regular intervals. That is, the first transfer roller 110 and the second transfer roller 120 repeatedly perform a process of transferring and stopping the electrode sheet 10 for a predetermined time at the regular intervals.

Figure 4:
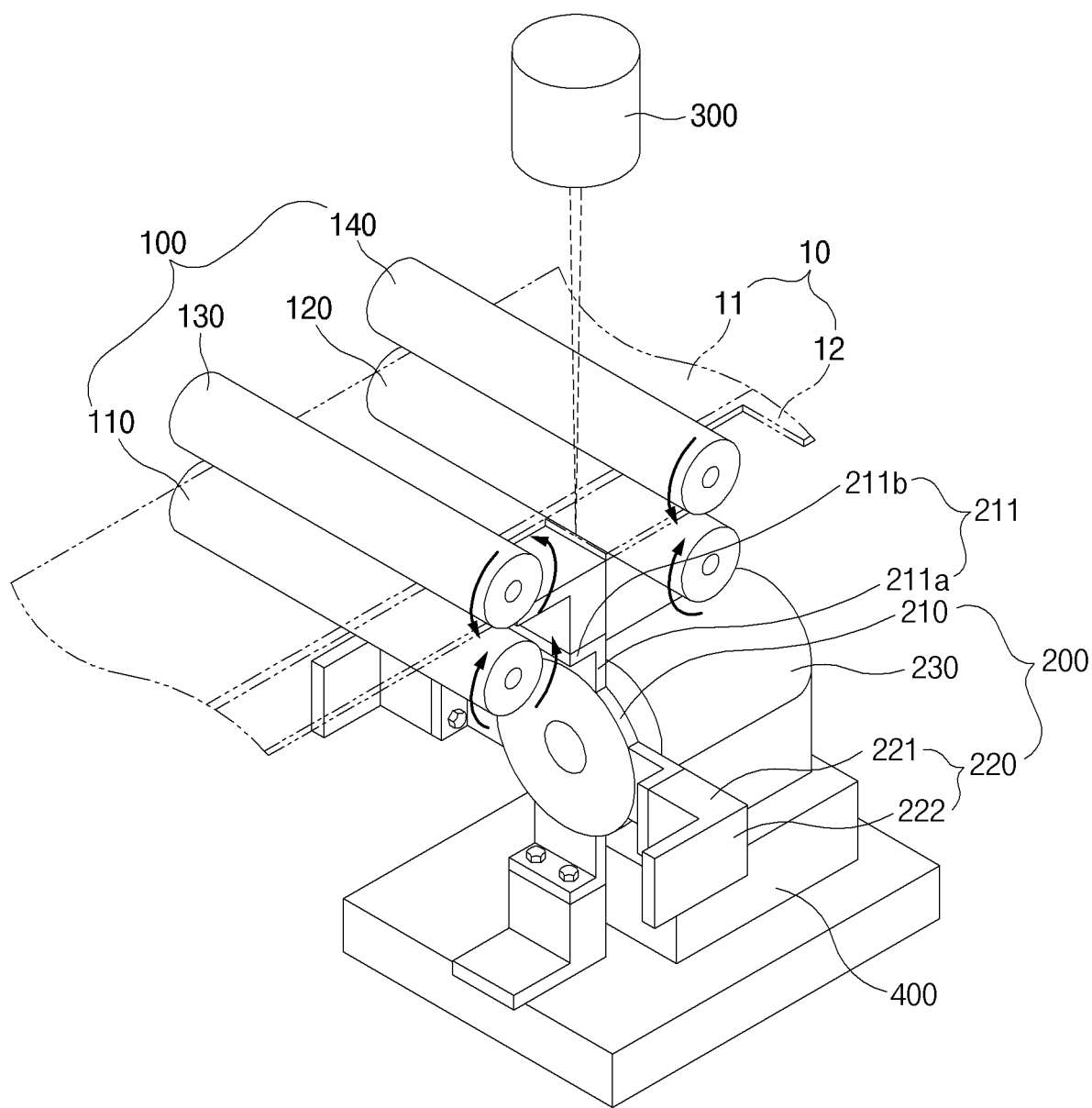
FIG. 4 is a perspective view illustrating another example of the apparatus for notching the electrode sheet according to the first embodiment of the present invention.

As illustrated in FIG. 4, according to another embodiment, a first auxiliary roller 130 is further provided on the top surface of the electrode sheet 10, which corresponds to the first transfer roller 110, a second auxiliary roller 140 is and further provided on the top surface of the electrode sheet 10, which corresponds to the second transfer roller 120.

That is, the first auxiliary roller 130 may stably transfer the electrode sheet 10 provided between the first auxiliary roller 130 and the first transfer roller 110 while being rotated in a direction opposite to a rotating direction of the first transfer roller 110, and the second auxiliary roller 140 may stably transfer the electrode sheet 10 provided between the second auxiliary roller 140 and the second transfer roller 120 while being rotated in a direction opposite to a rotating direction of the second transfer roller 120. Particularly, the first auxiliary roller 130 and the first transfer roller 110 or the second auxiliary roller 140 and the second transfer roller 120 may adjust tension of the electrode sheet 10 disposed between the first transfer roller 110 and the second transfer roller 120 to prevent the electrode sheet 10 disposed between the first transfer roller 110 and the second transfer roller 120 from vibrating.

Jig Unit

As illustrated in FIGS. 2 and 3, the jig unit 200 is configured to support the bottom surface of the non-coating portion of the electrode sheet disposed between the first and second transfer rollers and comprises a rotation member 210 provided on a lower portion of (or below) the electrode sheet 10 and disposed between the first and second transfer rollers 110 and 120 and two or more jigs 220 provided on an outer circumferential surface of the rotation member 210 to support the non-coating portion 12 disposed between the first and second transfer rollers 110 and 120 when the rotation member 210 is rotated.

Here, the rotation member 210 has a circular shape and is disposed between the first and second transfer rollers 110 and 120. In addition, the rotation member 210 is disposed rotatable in a direction perpendicular to the transfer direction of the electrode sheet 10 so that the two or more jigs 220 are disposed to sequentially support the non-coating portion 12.

That is, since the rotation member 210 is rotated in the direction perpendicular to the transfer direction of the electrode sheet 10, the first transfer roller 110 and the second transfer roller 120 may be disposed close to the rotation member 210. Thus, the electrode sheet 10 disposed between the rotation member 210 and the first transfer roller 110 and between the rotation member 210 and the second transfer roller 120 may be minimized in area to improve supporting force of the electrode sheet 10, thereby preventing the electrode sheet 10 from vibrating.

That is to say, the vibration of the electrode sheet 10 occurs between the rotation member 210 and the first transfer roller 110 and between the rotation member 210 and the second transfer roller 120, in which the electrode sheet 10 is not supported. That is, when the electrode sheet 10 disposed between the rotation member 210 and the first transfer roller 110 and between the rotation member 210 and the second transfer roller 120 increases in area, the vibration of the electrode sheet 10 may significantly occur. When the area is minimized, the vibration of the electrode sheet 10 may be significantly prevented. As a result, when the first transfer roller 110 and the second transfer roller 120 are disposed close to the rotation member 210, the electrode sheet 10 disposed between the rotation member 210 and the first transfer roller 110 and between the rotation member 210 and the second transfer roller 120 may be minimized in area.

Thus, the rotation member 210 may be disposed rotatable in the direction perpendicular to the transfer direction of the electrode sheet 10 to minimize the area of the rotation member 210 disposed between the first transfer roller 110 and the second transfer roller 120, and also, the first and second transfer rollers 110 and 120 may move to be installed close to the rotation member 210 so as to minimize the area of the electrode sheet 10 disposed between the rotation member 210 and the first transfer roller 110 and between the rotation member 210 and the second transfer roller 120.

Particularly, the jig unit 200 comprises two or more jigs 220 provided on an outer circumferential surface of the rotation member 210. Then, the first and second transfer rollers 110 and 120 may be disposed close to the jigs 210 to significantly minimize the area of the electrode sheet 10 disposed between the rotation member 210 and the first transfer roller 110 and between the rotation member 210 and the second transfer roller 120. That is, referring to FIG. 1, the rotation member 210 is rotated by a driving motor 230. The driving motor 230 may be disposed in the transfer direction of the electrode sheet 10 to cause friction between the driving motor 230 and the first transfer roller 110 or the second transfer roller 120.

To prevent this friction from occurring, the jigs 220 may be provided on the outer circumferential surface of the rotation member 120. Also, the first and second transfer rollers 110 and 120 may be disposed close to the jigs 220 to previously prevent the friction with the first transfer roller 110 or the second transfer roller 120 from occurring.

Each of the first and second transfer rollers 110 and 120 are disposed to be a first length a from each of the jigs 220 supporting the non-coating portion 12 formed on the electrode sheet 10. Here, he first length a may range from 30 mm to 100 mm.

That is, when the first length is less than 30 mm, the interference between the jig and the first and second transfer rollers may occur. Also, when the first length is greater than 100 mm, the electrode sheet may be deformed between the jig and the first transfer roller or between the jig and the second transfer roller. In this state, when the electrode sheet is transferred, the vibration may occur. As a result, the first length may range of 30 mm to 100 mm. Thus, the electrode sheet disposed between the first and second transfer rollers may be prevented from vibrating to accurately notch the non-coating portion of the electrode sheet disposed between the first and second transfer rollers, thereby improving quality of the electrode sheet.

The jig 220 is detachably coupled to a coupling part 211 provided on the outer circumferential surface of the rotation member 210. That is, the coupling part 211 comprises a vertical surface 211a provided on the same line as a line extending from the coupling part 211 toward a center of the rotation member 210 on the outer circumferential surface of the rotation member 210, a horizontal surface 211b which extends from a front end of the vertical surface 211a in a direction perpendicular to the line and on which the jig 220 is supported, and a bolt 211c passing through the horizontal surface 211b so as to be coupled to the jig 220. Here, the jig 220 may be coupled to or separated from the horizontal surface 211b by fastening or releasing the bolt 211c.

The jig 220 comprises a coupling piece 221 supported on the horizontal surface 211b of the coupling part 211 and detachably coupled to the horizontal surface 211b through the bolt 211c and a supporting piece 222 provided on a front end of the coupling piece 221 and extending in the direction opposite to the transfer direction of the electrode sheet 10 to support the non-coating portion 12.

Here, although the coupling piece 221 and the supporting piece 222 are made of the same material, the present invention is not limited thereto. For example, the coupling piece 221 and the supporting piece 222 are made of materials different from each other. That is, the coupling piece 221 may be made of a rigid material to minimize friction when the bolt 211c is coupled, and the supporting piece 222 may be made of a smooth metal material to prevent a mark from being generated on the non-coating portion 12 when supporting the non-coating portion 12. Although shown with four coupling parts 211 in FIG. 1 for example, the number of coupling parts 211 may vary.

The jig unit 200 having the above-described configuration may significantly minimize the area of the electrode sheet 10 disposed between the rotation member 210 and the first transfer roller 110 and between the rotation member 210 and the second transfer roller 120 to prevent the electrode sheet 10 from vibrating when being transferred.

Notching Unit

Referring to FIG. 1, the notching unit 300 irradiates layer beam to the non-coating portion 12 of the electrode sheet 10 along an edge of the jig 220 of the jig unit 200 to notch a portion except for an electrode tab scheduled portion, thereby forming an electrode tab.

The apparatus for notching the electrode sheet according to the first embodiment of the present invention further comprises an elevation unit 400 which allows the jig unit 200 to descend in a direction that is away from the non-coating portion 12 or vice versa.

That is, when the rotation member 210 is rotated in the state in which the jig 220 of the jig unit 200 supports the non-coating portion 12, the friction force between the jig 220 and the non-coating portion 12 may significantly increase due to a rotation radius of the jig 220 to generate the mark on the non-coating portion 12.

Elevation Unit

To prevent this problem, the apparatus for notching the electrode sheet according to the first embodiment of the present invention may comprise the elevation unit 400. The elevation unit 400 may allow the jig unit 200 to descend so that the jig 220 is separated by a predetermined length from the non-coating portion 12 before the rotation member 210 is rotated. Thus, even though the rotation member 210 is rotated, contact between the jig 220 and the non-coating portion 12 may be prevented to prevent the mark from being generated on the non-coating portion 12.

The elevation unit 400 may allow the jig unit 200 to ascend so that the jig 220 disposed between the first and second transfer rollers 110 and 120 supports the non-coating portion 12 after the rotation member 210 is rotated. Thus, the non-coating portion 12 of the electrode sheet 10 disposed between the first and second transfer rollers 110 and 120 may be stably supported. The rotation of the rotation member 210 and the movement of the elevation unit 400 can be coordinated. For example, the elevation unit 400 can ascend and descend once for a rotation of the rotation member 210 that provides the coupling part 211 against the non-coating portion 12. For example, the elevation unit 400 can ascend and descend once for a quarter rotation of the rotation member 210, but such is not required. For example, the rotation member 210 need not rotate for each ascend and descend of the elevation unit 400, in which case one coupling part 211 can be used more than one before occurrence of a rotation, or the elevation unit 400 can ascend and descend once for a half, a full rotation, or any other amount of rotation of the rotation member 210.

Thus, the apparatus for notching the electrode sheet according to the first embodiment of the present invention may prevent the electrode sheet 10 from vibrating when the electrode sheet 10 is notched. Thus, the non-coating portion 12 of the electrode sheet 10 may be accurately notched to form the electrode tab, thereby preventing the defective electrode sheet from being manufactured.

Hereinafter, a method for processing an electrode tab by using the apparatus for notching the electrode sheet according to the first embodiment of the present invention will be described.

[Method for Notching Electrode Sheet According to First Embodiment of the Present Invention]

The method for notching the electrode sheet according to the first embodiment of the present invention is configured to continuously notch the non-coating portion formed on the electrode sheet so as to be processed as the electrode tab. The method for notching the electrode sheet comprises a step (a) of transferring an electrode sheet 10 at regular intervals by using a transfer unit 100, a step (b) of disposing a jig 220 of a jig unit 200 on a bottom surface of a non-coating portion 12 of the electrode sheet 10, a step (c) of disposing the jig 220 of the jig unit 200 on the bottom surface of the non-coating portion 12 of the electrode sheet 10 by using an elevation unit 400, a step (d) of notching the non-coating portion 12 of the electrode sheet 10 along an edge of the jig 220 by using a notching unit 300, a step (e) of separating the jig 220 of the jig unit 200 supporting the non-coating portion 12 of the electrode sheet 10 by using the elevation unit 400, and a step (f) of repeatedly performing the steps (a) to (e) so that the non-coating portion 12 is continuously processed as an electrode tab.

Hereinafter, the method for notching the electrode sheet according to the first embodiment of the present invention will be described in detail with reference to the accompanying drawings.

Figure 5:
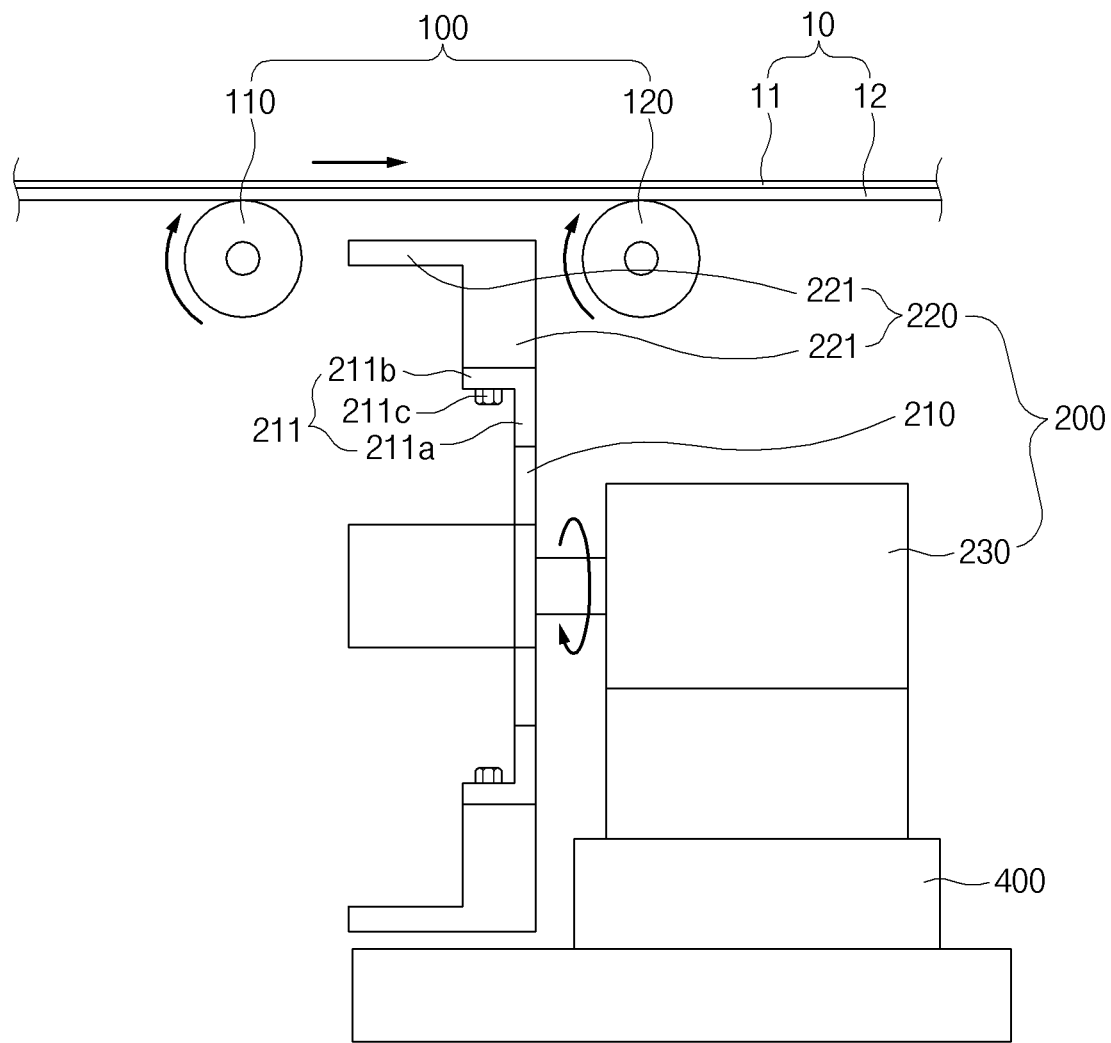

As illustrated in FIG. 5, in the step (a), the electrode sheet 10 is continuously transferred at regular intervals through first and second transfer rollers 110 and 120 of the transfer unit 100. That is, the transfer unit 100 rotates the first and second transfer rollers 110 and 120 at a predetermined angle or in number of times of rotation to continuously transfer the electrode sheet at the regular intervals. Thus, the non-coating portion 12 of the electrode sheet 10, which is not notched to be processed as the electrode tab, is continuously disposed at regular intervals between the first and second transfer rollers 110 and 120.

In the step (b), a rotation member 210 of the jig unit 200 is rotated so that any one of two or more jigs 220 provided on an outer circumferential surface of the rotation member 210 is disposed on a bottom surface of the non-coating portion 12 of the electrode sheet 10.

Here, the rotation member 210 may be disposed between the first and second transfer rollers 110 and 120 and disposed rotatable in a direction perpendicular to a transfer direction of the electrode sheet 10 so that the first and second transfer rollers 110 and 120 are disposed close to the jig 220 supporting the non-coating portion 12. Thus, the electrode sheet 10 disposed between the jig 220 and the first transfer roller 110 and between the jig 220 and the second transfer roller 120 may be significantly minimized in area to improve supporting force of the electrode sheet 10, thereby preventing the electrode sheet from vibrating.

The step (a) and the step (b) may be performed at the same time. That is, the first and second transfer rollers 110 and 120 are rotated, and simultaneously, the rotation member 210 is rotated. Thus, the electrode sheet 10 is transferred, and simultaneously, any one jig of the two or more jigs provided on the rotation member 210 is disposed on the non-coating portion of the electrode sheet. As a result, a work time may be significantly reduced to improve work efficiency.

Figure 6:
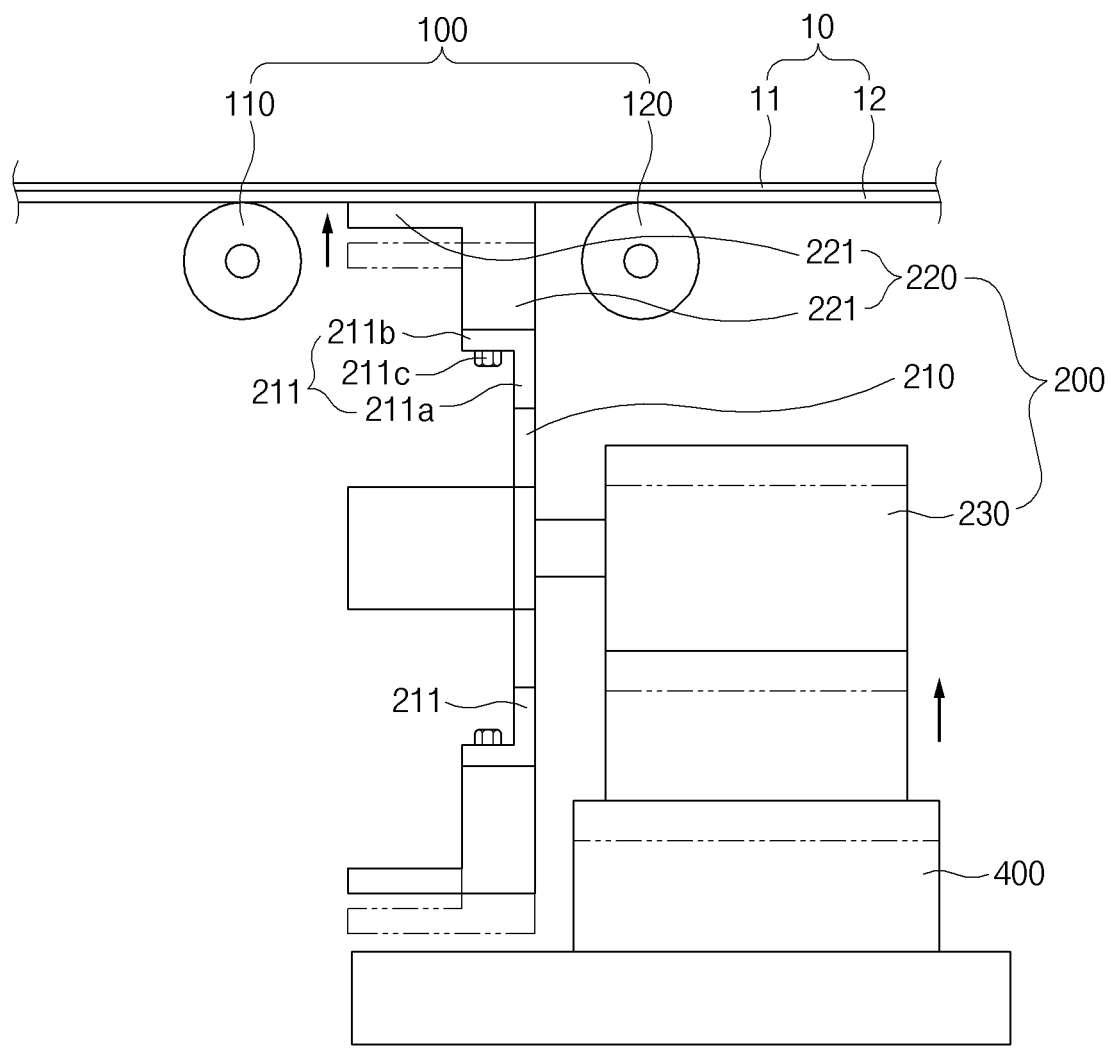

As illustrated in FIG. 6, in the step (c), the jig 220 of the jig unit 200 supports the bottom surface of the non-coating portion 12 of the electrode sheet 10 by using the elevation unit 400. That is, the jig unit 200 ascends at a predetermined height in the direction of the electrode sheet 10 by using the elevation unit 400 so that the jig 220 is closely attached to the bottom surface of the non-coating portion 12.

Figure 7:
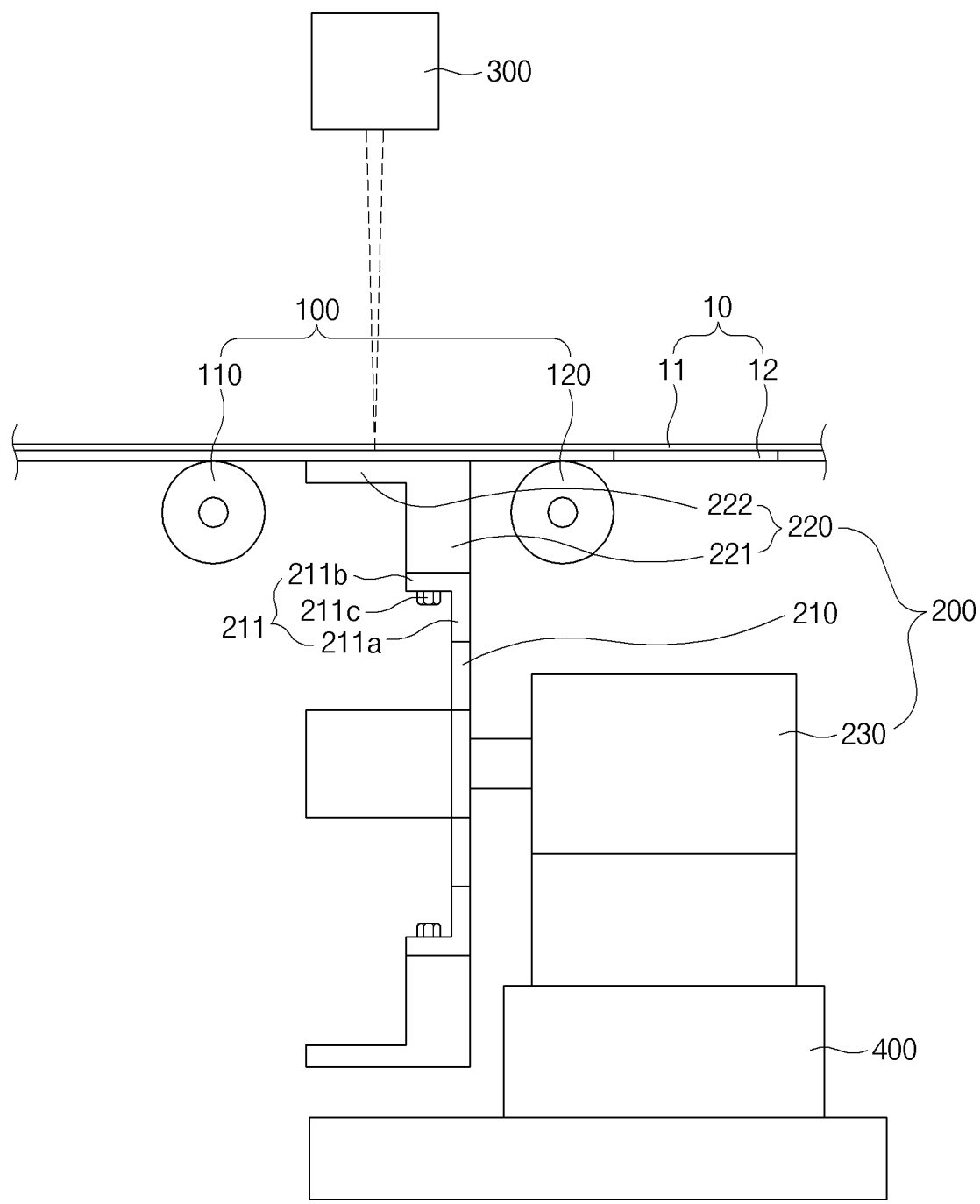

As illustrated in FIG. 7, in the step (d), the non-coating portion 12 of the electrode sheet 10 is notched along the edge of the jig 220 by using the notching unit 300 so as to be processed as the electrode tab. That is, the notching unit 300 irradiates laser beam to the non-coating portion 12 of the electrode sheet 10, on which the edge of the jig 220 is disposed, so as to be processed as the electrode tab.

In the step (e), when the electrode tab of the non-coating portion 12 disposed between the first and second transfer rollers 110 and 120 is completely processed, the elevation unit 400 allows the jig unit 200 to descend so that the jig 220 is separated from the non-coating portion 12 of the electrode sheet 10.

In the step (f), the steps (a) to (e) are repeatedly performed to notch the non-coating portion 12 of the electrode sheet 10 that is newly disposed between the first and second transfer rollers 110 and 120 so as to be processed as the electrode tab.

Figure 8:
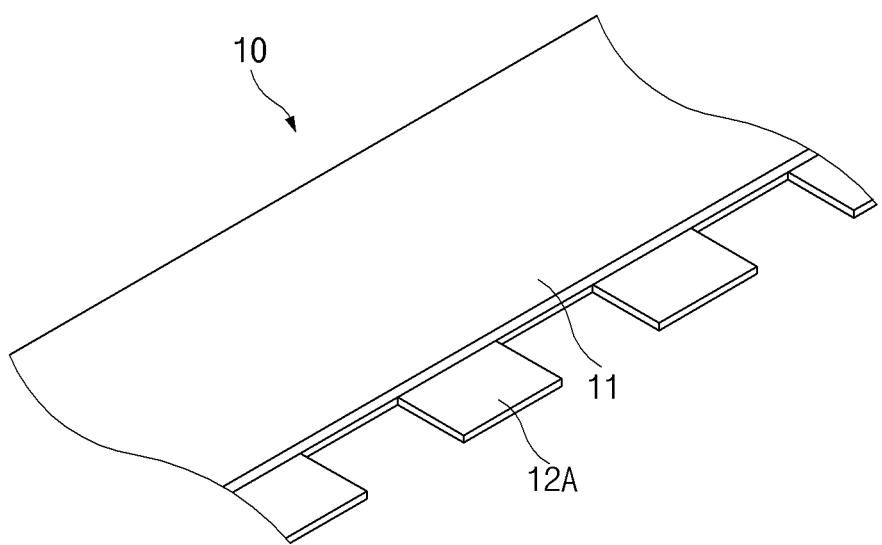
FIG. 8 is a perspective view illustrating an electrode sheet manufactured by the method for notching the electrode sheet according to the first embodiment of the present invention.

As described above, when the steps (a) to (f) are performed, the electrode sheet 10 comprising the coating portion 11 and the electrode tab 12A may be manufactured as illustrated in FIG. 8.

Hereinafter, in descriptions of another embodiment of the present invention, constituents of the second embodiment having the same constituent and function as the first embodiment have been given the same reference numeral in the drawings, and thus duplicated description will be omitted.

[Apparatus for Notching Electrode Sheet According to Second Embodiment of the Present Invention]

Figure 9:
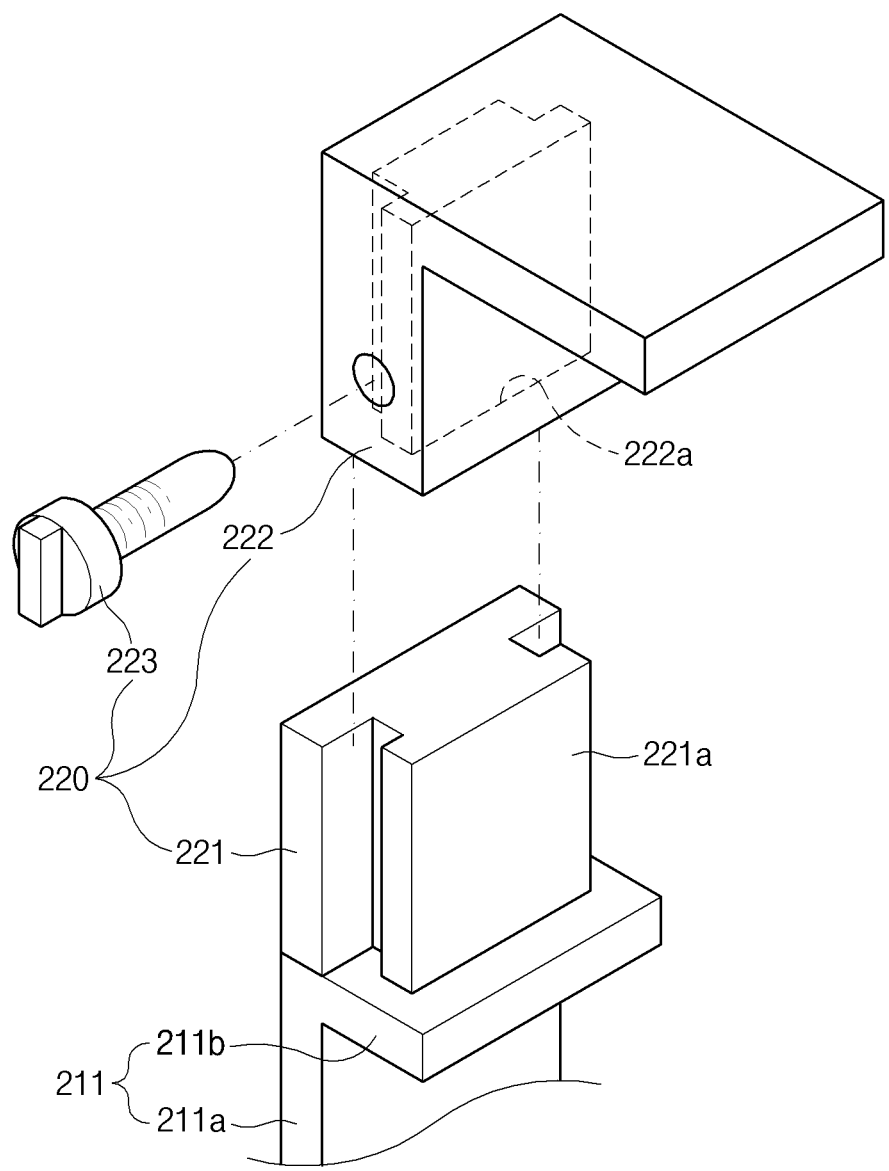
FIG. 9 is an exploded perspective view of an apparatus for notching an electrode sheet according to a second embodiment of the present invention.

FIG. 9 is an exploded perspective view of an apparatus for notching an electrode sheet according to a second embodiment of the present invention.

An apparatus for notching an electrode sheet according to a second embodiment of the present invention comprises a transfer unit 100, a jig unit 200, and a notching unit 300. The jig unit 200 comprises a rotation member 210 and two or more jigs 220. Each of the jigs 220 comprises a coupling piece 221 detachably coupled to a coupling part 211 of the rotation member 210 and a supporting piece 222 supporting a non-coating portion.

Here, the supporting piece 222 is movably coupled to the coupling piece in a direction of a center of the rotation member 210 or vice versa. Thus, the jig 220 may increase or decrease in length to adjust a distance between the jig 220 and the non-coating portion 12, which correspond to each other. That is to say, the jig 220 may be adjusted in length so that the jig 220 stably supports the non-coating portion 12.

For example, a guide protrusion 221a is formed on the coupling piece 221 in a direction of a center of the rotation member 210, and a guide groove 222a slidably coupled to the guide protrusion 221a is formed in the supporting piece 222.

Thus, the supporting piece 222 of the jig 220 may slidably move in the direction of the center of the rotation member 210 along the guide protrusion 221a of the coupling piece 221 or vice versa. As a result, the jig 220 may be simply adjusted in length, and thus, the non-coating portion 12 may be supported to be closely attached to the supporting piece 222.

The jig 220 further comprises a fixing piece 223 fixing the fixed supporting piece 222 to the coupling piece 221 without moving. That is, referring to FIG. 9, the fixing piece 223 may allow the fixing force of the supporting piece 222 to increase while pressing the coupling piece 221 after passing through a side surface of the supporting piece 222. Thus, the supporting piece 222 may be fixed to the coupling piece 221 without moving.

Accordingly, the scope of the present invention is defined by the appended claims rather than the foregoing description and the exemplary embodiments described therein. Various modifications made within the meaning of an equivalent of the claims of the invention and within the claims are to be regarded to be in the scope of the present invention.

The invention claimed is:

1. An apparatus for notching an electrode sheet, which continuously notches a non-coating portion of the electrode sheet so as to be processed as an electrode tab, the apparatus comprising:
   a transfer unit comprising first and second transfer rollers provided on a bottom surface of the electrode sheet to transfer the electrode sheet at regular intervals;
   a jig unit provided below the electrode sheet, disposed between the first and second transfer rollers, and supporting the bottom surface of the non-coating portion; and
   a notching unit provided above the electrode sheet to notch the non-coating portion supported on the jig unit to provide the electrode tab,
   wherein the jig unit comprises:
   a rotation member provided between the first and second transfer rollers and rotated in a direction perpendicular to a transfer direction of the electrode sheet;
   two or more jigs provided on an outer circumferential surface of the rotation member to alternately support the non-coating portion disposed between the first and second transfer rollers when the rotation member is rotated; and
   an elevation unit allowing an entirety of the jig unit as a whole to descend in a direction that is away from the non-coating portion or ascend in a direction towards the non-coating portion.

2. The apparatus of claim 1, wherein each of the first and second transfer rollers is disposed to be spaced by a length from each of the two or more jigs supporting the non-coating portion formed on the electrode sheet.

3. The apparatus of claim 2, wherein the length ranges from approximately 30 mm to 100 mm.

4. The apparatus of claim 1, wherein the rotation member is rotated as the first and second transfer rollers are rotated to circulate the two or more jigs, and is to be interlocked when disposed one at a time on the non-coating portion between the first and second transfer rollers.

5. The apparatus of claim 1, wherein the two or more jigs are detachably coupled to a coupling part provided on an outer circumferential surface of the rotation member.

6. The apparatus of claim 5, wherein each of the two or more jigs comprises a coupling piece detachably coupled to the coupling part and a supporting piece supporting the non-coating portion.

7. The apparatus of claim 6, wherein the supporting piece is movably coupled to the coupling piece in a direction of a center of the rotation member or vice versa so that a length of each jig is adjusted.

8. The apparatus of claim 7, wherein each of the two or more jigs further comprises a fixing piece fixing the supporting piece to the coupling piece.

9. A method for notching an electrode sheet, which continuously notches a non-coating portion formed on the electrode sheet so as to be processed as an electrode tab, the method comprising:
   an operation (a) of rotating first and second transfer rollers to transfer the electrode sheet at regular intervals;
   an operation (b) of rotating a rotation member of a jig unit in a direction perpendicular to a transfer direction of the electrode sheet to allow any one jig of two or more jigs provided on the rotation member to be disposed on a bottom surface of the non-coating portion disposed between the first and second transfer rollers;
   an operation (c) of allowing the rotation member to ascend by using an elevation unit to allow an entirety of the jig unit as a whole to ascend in a direction towards the non-coating portion so that the jig supports the bottom surface of the non-coating portion;
   an operation (d) of notching the non-coating portion supported on the jig y using the notching unit so as to be processed as an electrode tab; and
   an operation (e) of allowing the rotation member to descend by using the elevation unit to allow the entirety of the jig unit as a whole to descend in a direction away from the non-coating portion so that the jig is separated from the electrode sheet.

10. The method of claim 9, wherein operation (a) to (e) are repeatedly performed to continuously process the non-coating portion disposed between the first and second rollers so as to be processed as the electrode tab.

11. The method of claim 9, wherein operations (a) and operation (b) are performed as the same time.

12. An apparatus for continuously notching an electrode sheet at a non-coating portion of the electrode sheet to be processed as an electrode tab, the apparatus comprising:
   a first and second transfer rollers provided on a bottom surface of the electrode sheet including the non-coating portion and a coating portion to transfer the electrode sheet at regular intervals;
   a jig unit provided below the electrode sheet at a location between the first and second transfer rollers, and periodically supporting the bottom surface of the non-coati rig portion;
   a notching unit provided above the electrode sheet to periodically notch the non-coating portion supported on the jig unit to provide the electrode tab; and
   an elevation unit allowing an entirety of the iig unit as a whole to descend in a direction that is away from the non-coating portion or ascend in a direction towards the non-coating portion,
   wherein the jig unit comprises:
   a rotation member provided between the first and second transfer rollers and rotated when the electrode sheet is moved in a transfer direction of the electrode sheet; and
   at least one jig provided on an outer circumferential surface of the rotation member to periodically support the non-coating portion at a location between the first and second transfer rollers.

13. The apparatus of claim 12, wherein each of the first and second transfer rollers is disposed to be spaced by a length from each of the at least one jig supporting the non-coating portion formed on the electrode sheet.

14. The apparatus of claim 13, wherein the length ranges from approximately 30 mm to 100 mm.

15. The apparatus of claim 12, wherein the rotation member is rotated as the first and second transfer rollers are rotated to circulate the at least one jig, and is interlocked when disposed on the non-coating portion between the first and second transfer rollers.

16. The apparatus of claim 12, wherein the at least one jig is detachably coupled to a coupling part provided on an outer circumferential surface of the rotation member.

17. The apparatus of claim 16, wherein the at least one jig comprises a coupling piece detachably coupled to the coupling part and a supporting piece supporting the non-coating portion.

18. The apparatus of claim 17, wherein the supporting piece is movably coupled to the coupling piece in a direction of a center of the rotation member or vice versa.

19. The apparatus of claim 18, wherein the at least one jig further comprises a fixing piece fixing the supporting piece to the coupling piece.

* * * * *